United States Patent [19]

Weiss et al.

[11] Patent Number: 5,448,116
[45] Date of Patent: Sep. 5, 1995

[54] LINEAR MAGNETIC MOTOR WITH ROTATIONAL OUTPUT

[76] Inventors: Abraham Weiss, deceased, late of Encino; by Sol Weiss, executor; Gary S. Weiss; Ronald I. Weiss, all of 17144 Bullock St., Encino, Calif. 91316

[21] Appl. No.: 179,916

[22] Filed: Jan. 11, 1994

[51] Int. Cl.⁶ .............................................. H02K 33/12
[52] U.S. Cl. .................................... 310/24; 310/17
[58] Field of Search ............... 310/15, 17, 23, 24, 310/34, 35

[56] References Cited

U.S. PATENT DOCUMENTS

| | | | |
|---|---|---|---|
| 3,967,146 | 6/1976 | Howard | 310/80 |
| 4,358,693 | 11/1982 | Palmer et al. | 310/46 |
| 5,121,016 | 6/1992 | Wachi | 310/14 |

Primary Examiner—Steven L. Stephan
Assistant Examiner—Judson H. Jones
Attorney, Agent, or Firm—Gerald L. Price

[57] ABSTRACT

A linear magnetic motor having a plurality of stationary electro-magnets coupled to a battery, an elongated rod associated with each magnet adapted to extend therein and a plate moveable to and from each respective magnet along each respective rod. A block member is associated with each plate having a shaft pivotally connected thereto and fixedly connected to offset portions of a rotatable axle. The plate moves alternatively opposite to each other and the electromagnetic fields induced between each respective plate and its corresponding magnet translates into linear motion of the rods and the parts connected thereto to rotate the axle.

16 Claims, 5 Drawing Sheets

LINEAR MAGNETIC MOTOR WITH ROTATIONAL OUTPUT

BACKGROUND OF THE INVENTION

1. Field of the Invention

The invention relates to a linear magnetic motor adapted to rotate an axle for driving wheels or other rotating devices.

2. Description of the Prior Art

Currently, domestic automobiles are powered by gasoline or other fossil fuel driven engines. It is well-known that the fuels used in these engines produce pollutants in the atmosphere which are unhealthful to human and other life. It is therefore imperative that means be found to provide alternative mechanisms to drive automobiles and other machines which do not require environmentally polluting energy sources. Electricity is one such non-polluting source.

Other electric automotive systems have been devised using battery power. The majority of electrical cars today use a single engine, with its rotary element acting as a drive shaft for the vehicle. The problem with their efficiency is that not only does the rotary element rotate but the entire coil rotates inside the motor. The more powerful the motor gets, the heavier and thicker coil wires will be needed, which increase the mass of the rotating shaft.

There is a need for a motor which is efficient and nonpolluting and requires less energy than known motors.

SUMMARY OF THE INVENTION

It is an object of this invention to provide a magnetically operated motor for rotating a shaft which is efficient and non-polluting.

It is a further object of this invention to provide an electrically powered engine wherein alternately energized connecting rods coupled via crankshafts to a drive shaft provide the operating mode of the engine.

It is still another object of the invention to provide an electric engine for an automotive device driven by connecting rods which are actuated alternately by a motorized switching system and wherein the switching system is made up of alternate contact positions on a rotatable element which will control the speed of the engine by the rotation speed of the switching system motor.

These and other objects of the invention are accomplished by providing one or more pairs of electrically actuated linear connecting rods coupled to respective crank elements of an axle to drive an automotive system or the like wherein the connecting rods are alternately switched on and off to rotate the axle, such as a crankshaft in a two-stroke sequence, for each pair of electromagnetics as the armatures of the connecting rods are alternately extended and retracted. Switching between the connecting rods is accomplished with a motor-driven rotating switch element, the control of the rotational speed of which is an engine speed or acceleration control.

DESCRIPTION OF THE PREFERRED EMBODIMENT

Figure 1:
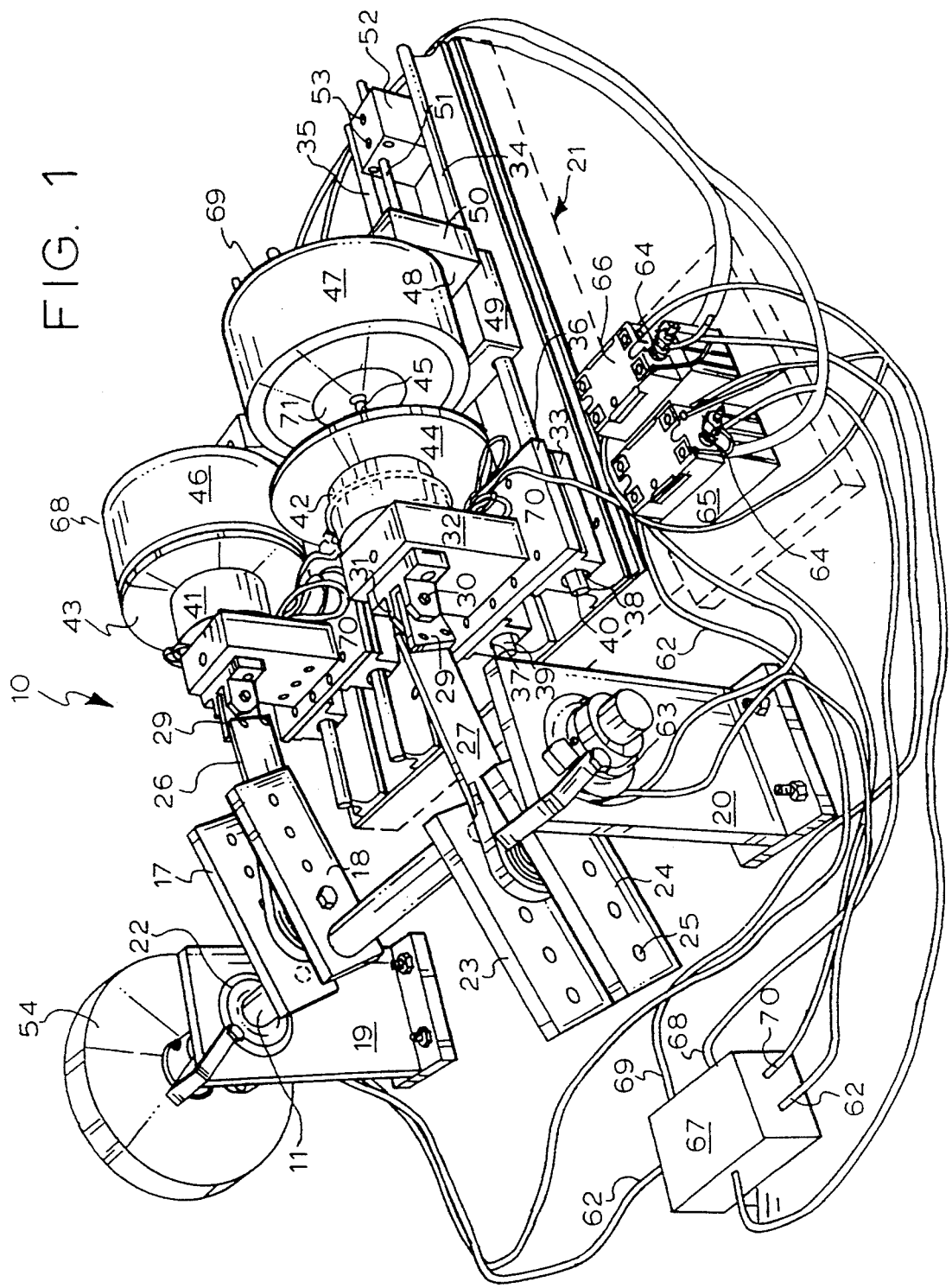
FIG. 1 is a perspective view, partly schematic, of apparatus in accordance with the teachings of the invention.

Referring now to FIG. 1 of the drawing, apparatus 10 is shown including a drive shaft or main axle 11. Main axle 11 is shown schematically in FIG. 2 and, thus, has a first elongated portion 12, a first offset portion 13, a second elongated portion 14 coaxial with portion 12, a second offset portion 15 and a third elongated portion 16 coaxial with portions 12 and 14. As seen, offset portions 13, 15 each have spaced arms 17, 18 and 23, 24 of the same length interconnecting offset portions 13, 15, respectively, to portions 12, 14 and 16 and extending in opposite directions.

As seen in FIG. 1, axle 11 is journalled for rotation in a pair of spaced upstanding brackets 19, 20 mounted to surface 21 in any suitable manner. Each bracket 19, 20 has a bearing assembly 22 mounted therein through which axle 11 extends.

As seen in FIG. 1, each arm 17, 18, 23, and 24 has a plurality of spaced holes 25. Arms 26, 27 are mounted between spaced arms 17, 18 and 23, 24. Thus, each arm 26, 27, such as arm 26 in FIG. 3, has an integral extension portion 28 fixed to offset portion 15. Offset portion 15 is in turn fixed to opposed spaced holes 25 in arms 17, 18.

Each arm 26, 27 has, at its other end, an extension portion 29 pivotally connected via pivot pin 30 (FIG. 1) in a yoke member 31. Each yoke member 31 is integral with a block member 32 upstanding from a pair of spaced rails 34, 35 mounted on surface 33 (obviously, surface 33 may be the same level as surface 21).

Each block member 32 is mounted to a support member 36 having spaced through holes 37, 38 receiving rods 39, 40, respectively, of rails 34, 35 therethrough. Support members 36 thus reciprocate back and forth on rods 39, 40. It can be appreciated that, when arms 26, 27 are moved, block members 32 are moved along rods 39, 40.

A pair of magnets 41, 42 are mounted to each block member 32. Each magnet 41, 42 has a round metallic plate, plates 43, 44, respectively, fixed thereto for movement therewith. Plates 43, 44 act as yokes for the magnets as will be discussed. A centrally mounted rod 45 extends through respective ones of plates 43, 44, through respective magnets 41, 42, and is secured to block member 32. Plates 43, 44 and magnets 41, 42 are fixedly secured to rods 45. The other end of each rod 45 extends into an opening in a magnet spaced from each magnet 41, 42, such as magnets 46, 47, respectively. As seen in FIG. 1, plates 43, 44 are relatively of the same outer diameter as magnets 46, 47.

Each magnet 46, 47 is mounted in an L-shaped support 48 having a first horizontal portion 49, on which magnets 46, 47 (as magnet 47 in FIG. 1) sits, and a rear integral upstanding portion 50. Spaced rods 39, 40 extend through suitable holes in horizontal portions 49. A rod member 51 is fixed at one end to upstanding portion 50 and at its other end extends through a block member 52 mounted between rods 39, 40 on each rail 34, 35. A plurality of threaded holes 53 may be provided in block member 52 for receiving set screws or the like for securing block member 52 in a desired position on each rail 34, 35. Thus, the distance of each magnet 46, 47 from its respective block member 52 may be varied as will be discussed further hereinbelow. This will control the speed of the turns on apparatus 10.

A flywheel 54 is also mounted at one end of axle 11 having an integral collar 55 (FIG. 3) with a set screw 56 extending through collar 55 and into engagement with axle 11 for securing flywheel 54 to axle 11. Flywheel 54 thus stabilizes vibrations of axle 11 and provides inertia to the rotation thereof, as will be discussed.

Figure 3:
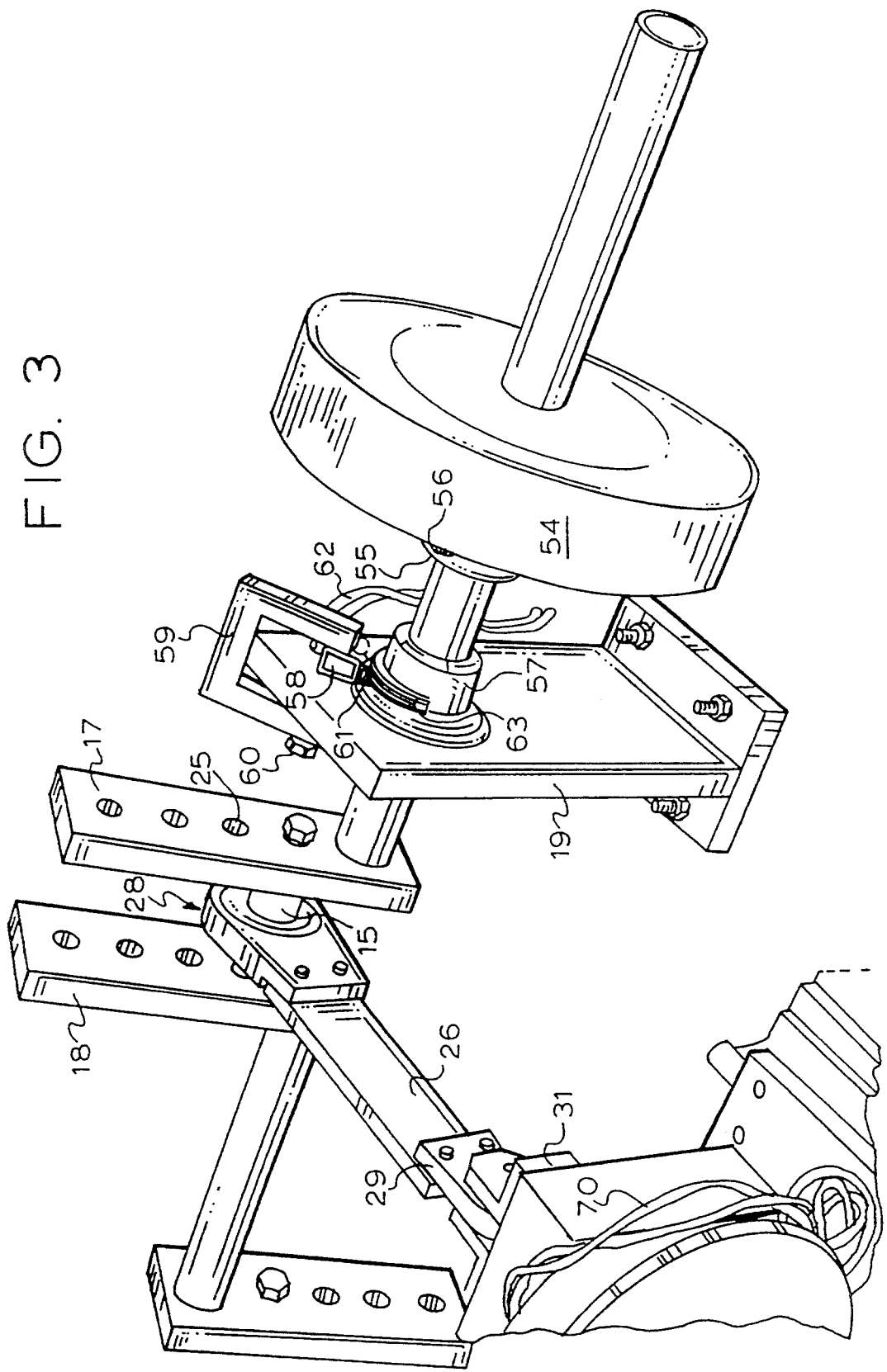
FIG. 3 is a detailed perspective view of a portion of the apparatus of FIG. 1.

As also seen in FIG. 3, a sleeve 57 is mounted on axle 11 adjacent bracket 19 having a camming portion thereon. A U-shaped bracket 59 is mounted to the upper end of bracket 19 via bolt 60. A contact switch 58 is mounted to bracket 59 and held in a position adjacent sleeve 57. Contact switch 58 has a roller 61 mounted thereon engaging sleeve 57. Suitable electrical conduits 62 extend from switch 58 to suitable switches in the form of transistors and microprocessors 65, 66 (FIG. 1) mounted on surface 21. Of course, any suitable number of microprocessors may be used. Also, a like collar 55, set screw 56, sleeve 57, contact switch 58, bracket 59, bolt 60, roller 61 and conduit 62 is associated with each end of axle 11 as seen in FIGS. 1 and 3.

Thus, each sleeve 57 has a camming portion 63 thereon adapted to engage roller 61 (normally inactivated) and send an electrical signal at a predetermined time, as will be discussed. These camming portions 63 are oppositely mounted on their respective sleeves 57 so that electrical signals are sent, when roller 61 engages each respective camming portion 63 and a switch is activated, at different intervals. This will move arms 26, 27 in opposite directions.

Each microprocessor may have a conventional diode 64 associated therewith to protect the transistorized switches 65 and 66 when they are at the "off" stage.

Figure 4:
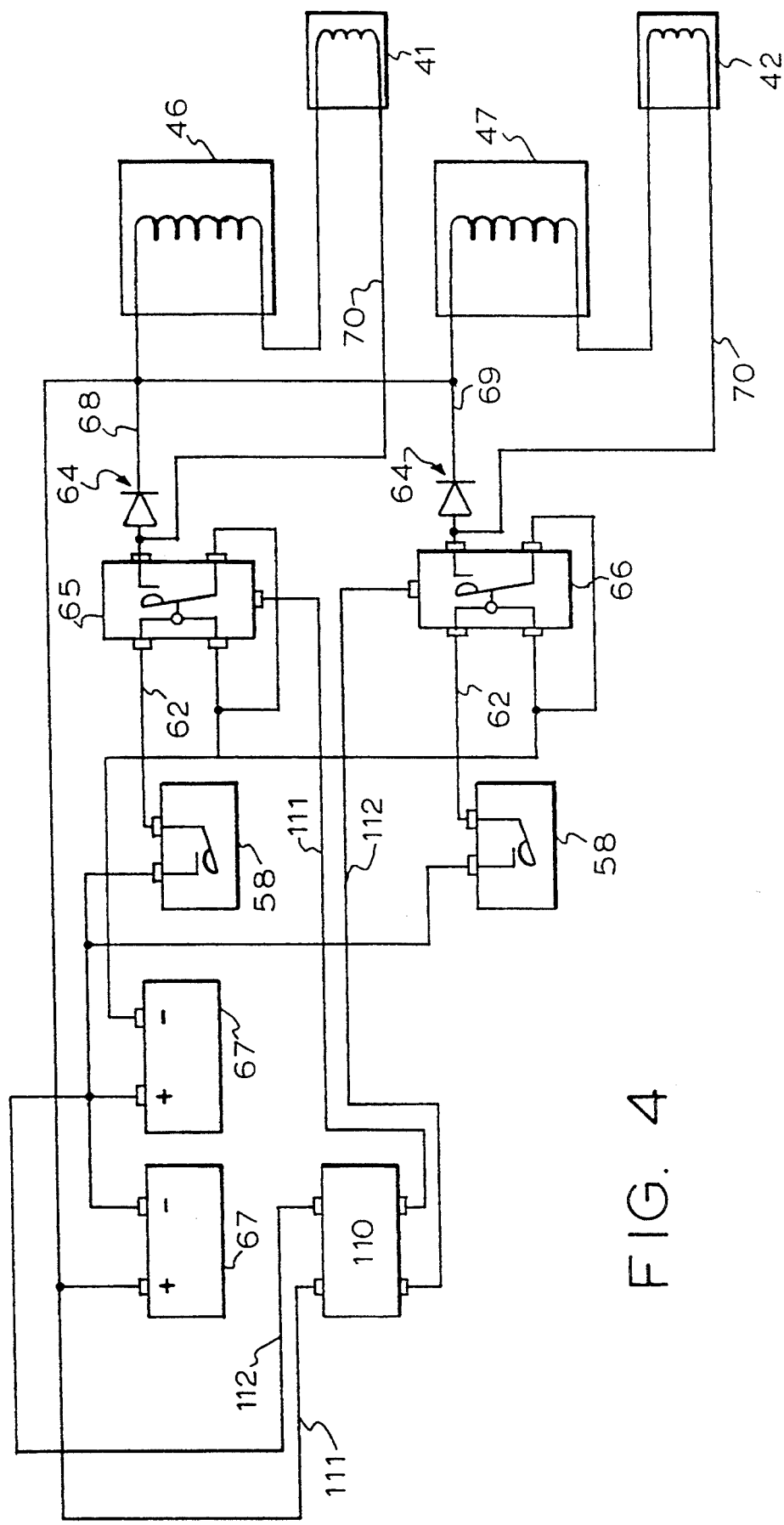
FIG. 4 is a schematic drawing of the electric circuitry for carrying out the invention.

Microprocessors 65, 66 are electrically coupled to a suitable source of electricity, such as battery 67 (FIG. 1). Thus, conventional 12 volt, 10 amp, D.C. voltage batteries, such as car batteries, may be used and the system could be self contained and mounted on a vehicle or the like. Such batteries may be used in series to increase the voltage. FIG. 4 illustrates how 2 such batteries 67 may be used.

Thus, as seen in FIG. 4, suitable conduits 68, 69, may be coupled to each magnet 46, 47 extending to batteries 67 for providing voltage to magnets 46, 47.

The spaced holes 25 in arms 26, 27 (FIG. 3) allow smaller or greater rotations as predetermined by the size or diameter of axle 11. It is to be understood that rods 45 enter openings or cores 71 in the center of magnets 41, 42 and in the center of magnets 46, 47. Such openings must be large enough so that rods 45 do not touch the inner walls of magnets 41, 42, 46, and 47. Also, as seen in FIGS. 1 and 3, suitable electrical conduits 70 extend between battery 67 and magnets 41, 42 for activating magnets 41, 42.

Figure 2:
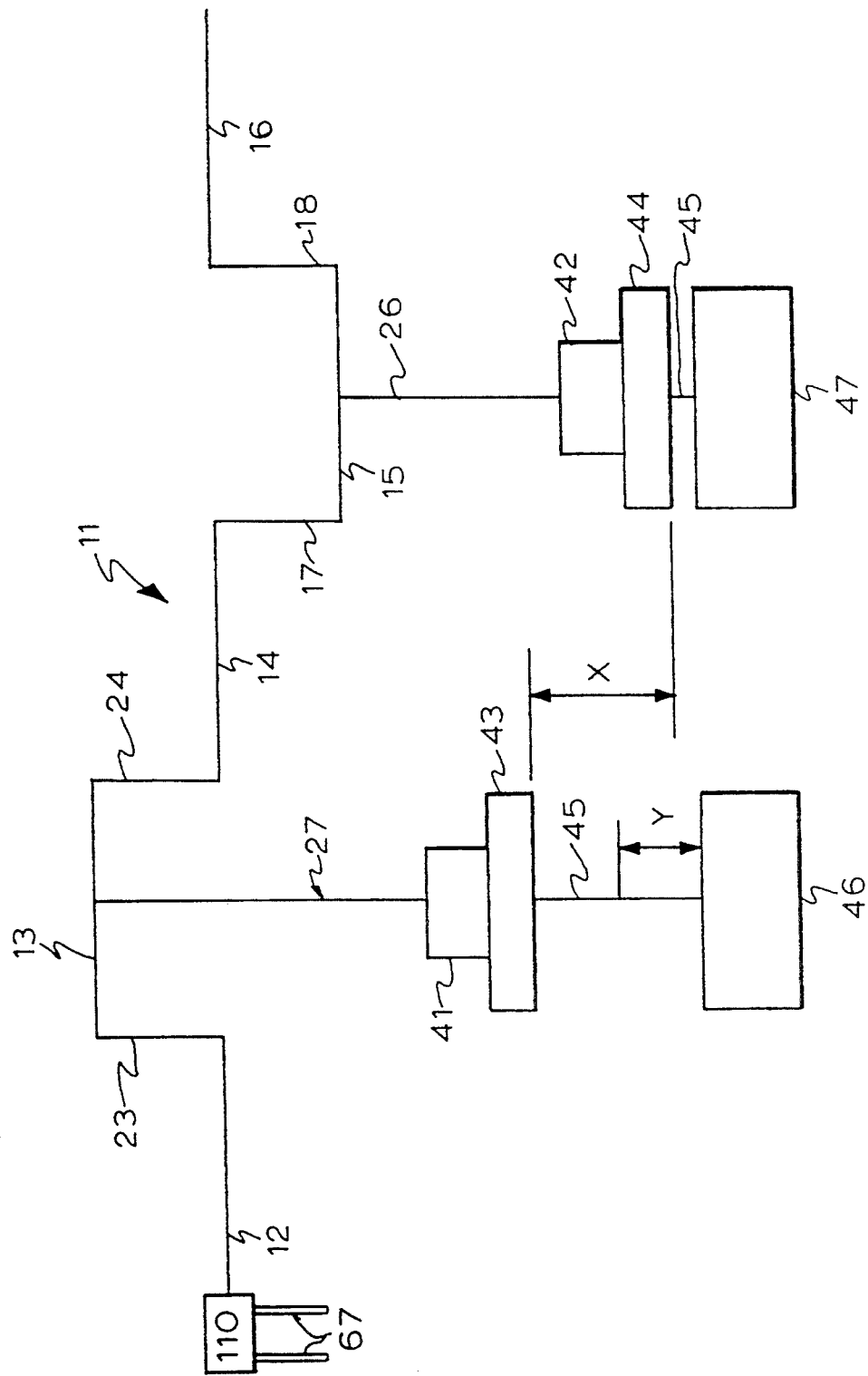
FIG. 2 is a schematic illustration of certain operating parts of the apparatus of FIG. 1.

As seen in FIG. 2, the stroke length X is the distance between yokes 43, 44. This is the spacing between yokes 43, 44 as the latter approaches the electromagnet's field. Preferably, current is applied only in the efficient area, as defined by y, by any suitable means associated with microprocessors 65, 66, such as conventional electronic or electro-optical distribution means.

The apparatus 10 is highly efficient. Only the amount of current necessary for the desired speed or load need be used. A conventional gas engine wastes fuel in the deceleration mode.

Conventional microprocessors may be used to apply only enough current for the speed or load required. Also, upon deceleration (or coasting or braking), a back electro-magnetic force may be generated fed back to the batteries.

Apparatus 10 may be made up of modular components so that piston plates, rods, magnetic units, etc. can be quickly and easily added. Current is only required to be applied at the most efficient segment of the cycle as the piston plates 43, 44 approach the electromagnetic field, i.e., the field between the magnets 46, 47 and plates 43, 44. Current need only to be applied in the efficient area of this field by means of an electronic or electro-optical distributor.

Noise is reduced over that noise generated by conventional engines. The placement of plates 43, 44 mounted on their respective rods is parallel with the plane of the magnets 46, 47. This assists in capturing more of the magnetic field originating at the electromagnets.

The interconnection of components to axle 11 simulates conventional coupling to a car axle. Ordinary vehicle wheels may be attached at each end of axle 11. Thus, as the rods translate in a linear orientation, the axle 11 rotates about its axis perpendicular to the axis of rods 45. The switches transform the power of the batteries into pulsed waves and directs these waves to the magnets. When the pulse is high, the electromagnets are energized pulling rods 45 and the plates 43, 44. When the pulse is at the "off" state, the rods 45 are free to move. Apparatus 10 may thus be mounted on the frame of a vehicle.

Axle 11's rotational momentum or inertia via flywheel 54 allows rods 45 to move out of their respective electromagnet when the rod 45 is free. The recharging mechanism via switches 58 and related apparatus recharges the batteries when needed on downhill motion provided the microprocessors activate this action. The microprocessors and their control circuitry control the speed and duration of the pulses. Instead of microprocessors, solid state power transistors can be used to control the pulsed signals.

Any suitable materials or dimensions may be used. Flywheel 54 may be 20 lbs. or so. Magnets 46, 47 may be 36 volt, 10 amp magnets. The transistors associated with microprocessors 65, 66 allow for current being on and off and control the input thereto to magnets 41, 42, 46, and 47.

Rods 45 may vary in diameter so that the magnets 46, 47 may have more mass to attract larger yokes or plates 43, 44. Rods 45 may also vary in length to extend the distance they can move. Providing current to secondary magnets 41, 42 provides a greater amount of attraction power with the magnets 46, 47 if more power is needed. Power to all of the magnets 41, 42, 46, and 47 may be varied as to voltage and amperage so as to optimize the power necessary for accomplishing the most efficient work. Of course, power ratings of the apparatus cannot be exceeded or the magnets will overheat.

Any suitable off-the-shelf components may be used. For example, the following commercial devices can be used for the parts indicated:

| 1. | Electro-magnets 41, 42 | 20-031 Iron-Clad | Edmund Scientific Chicago, IL |
| --- | --- | --- | --- |

-continued

| | | | |
|---|---|---|---|
| 2. | Electro-magnets 46, 47 | Dissectable magnet DEA-1 RE-60303-S 36V-10A | McMasters Carr Santa Fe Springs, CA |
| 3. | Contact switch 58 | 9240 V3L 139.D8 V2A 125VDC 1/4A250VDC. 11A113HP125 250, 277VAC 4A125VACL 5U. L156 | G. C. Electronics Rockford, IL |
| 4. | Transistors/ Microprocessors 65, 66 | G3NA-D210B Solid State Relay 5-200 VDC 10A 5-24 VDC −4 +3 | Omron Electronics Orange, CA |
| 5. | Battery 67 | 2633E | Sears Diehard Deep Cycle Marine Sears, Chicago, IL |
| 6. | Diode 64 | SK3607 | R.C.A. 1101 Kings Hwy. Deptford, NJ |

It can be seen that there is disclosed an efficient motor that non-polluting and highly efficient. The need for increasing power requirements is eliminated. One of the plates 43 or 44 and its respective magnet remains extremely close to its respective electro-magnet (46, 47) at maximum displacement. The core of each magnet 46, 47 has a radial opening along the axis thereof so that, as each plate 43 or 44 approaches its respective magnet 46 or 47, the rod 45 enter the core 71 in the magnet 46 or 47. The magnetic flux inside of magnets 46, 47 is at its highest value so that a maximum amount of force can be exerted on rods 45 and the components connected thereto. This minimizes the power that the apparatus 10 must provide without sacrificing output power. The apparatus 10 can then operate for a long period of time.

A series of conventional storage cell batteries, such as lead acid cell batteries, can be used. The quantity and voltage rating on the batteries selected will be a function of the power requirement dictated by its application. Since power is proportional to the voltage times the current, longer mean time between battery charges can be accomplished by decreasing the current use. This is done at the expense of added voltage, namely more batteries, to maintain the level of input power into the system. By providing apparatus 10 with the increasingly efficient batteries of today and tomorrow, the mean time between battery charges can improve dramatically. This system not only is an electrical to mechanical conversion device but, through a loop back system, it allows the power source to be recharged while in an operating mode with the use of a recharging system.

The electrical signal input to the electromagnets 46, 47 must be in a form of repetitive wave, whether DC finite step or AC sinusoid in shape. The repetitive input signal causes the electromagnets 46, 47 to induce magnetic field intensity as a function of time. This will translate into a predetermined linear motion of rods 45 along their axes. Thus, any suitable means to input AC or DC current to electromagnets 46, 47 may be used.

Any suitable number of rods 45, plates 43, 44, electro-magnets 41, 42, 46, 47, etc. may be used. The important characteristics of the magnets selected to consider are their inductance, resistance, magnetic flux linkages, current and voltage handling capabilities, as well as heat dissipation factors. The circuit means employed senses the lack of power demands by the apparatus and temporarily disconnect the battery from the apparatus. Hence, at times of free motion the apparatus will actually act as a recharging unit and not use any battery power.

Figure 5:
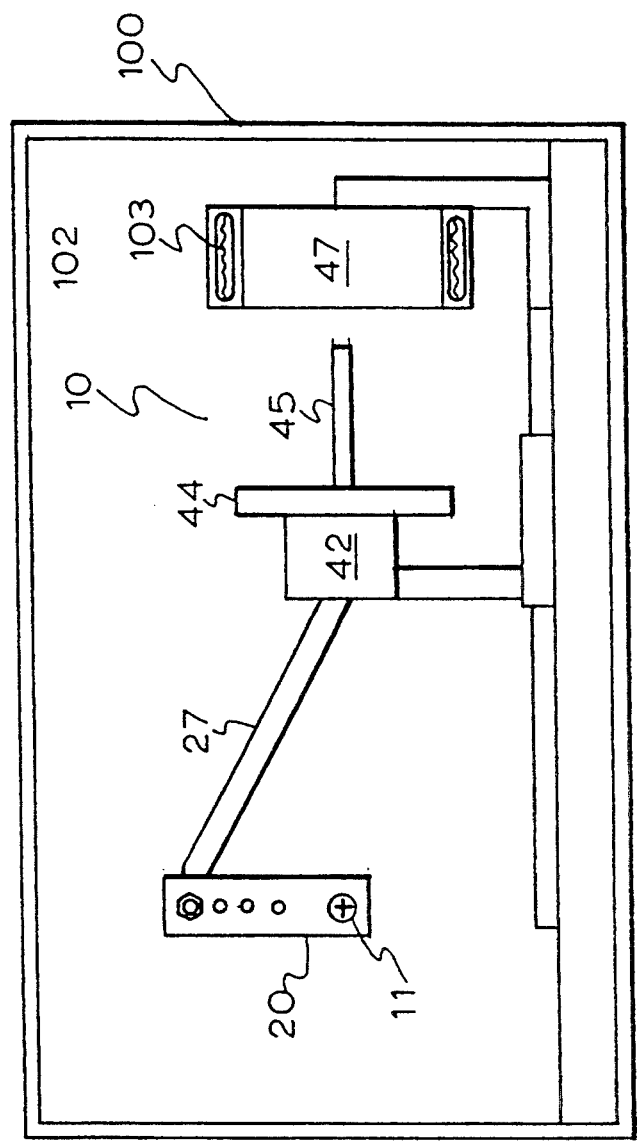
FIG. 5 is a schematic illustration of the apparatus 10 of the invention hermetically sealed of a housing.

If desired, the entire assembly 10 may be enclosed in a hermetically sealed housing 100. Axle or shaft 11 would of course extend out of an opening in housing 100 through a suitable hermetic seal 101. Also, electromagnets 46, 47 (only magnet 47 shown in FIG. 5) may be submersed in a suitable cooling liquid or gas 102 inside of housing 103 to provide for heat dissipation and improved conductivity.

Microprocessors 65, 66 may be of the type that, at times of power needs, act as a distributor of energy, and, at non-critical power demand cycles shut off power and activate a battery recharging device, such as device 110 in FIG. 4, coupled to batteries 67; via conduits 111, 112, respectively. A suitable battery recharging device would be a conventional alterator.

Also, as seen schematically in FIG. 2, recharging device 110 may be coupled to axle or shaft 11, which is controlled by suitable microprocessors and batteries as schematically seen in FIG. 4. Also, state of the art electronic control means, such as fuzzy local controls, may be used where possible. For convenience of illustration, the components coupled to batteries 67 in FIG. 2 have been omitted.

Although a particular embodiment of the invention has been disclosed, variations thereof may occur to an artisan and the scope of the invention should be determined only by the scope of the appended claims.

We claim:

1. Apparatus for converting electro-magnetism to rotational movement of a shaft or the like comprising:
  a housing;
  a rotatably mounted shaft mounted on said housing, said shaft having at least a pair of spaced offset portions integral thereon and extending in opposite directions;
  an elongated arm fixed at one end to each of said offset portions and pivotally connected at the other end to a block member, each of said block members being slidably mounted on a pair of spaced elongated rails mounted on said housing;
  a magnet fixedly mounted to each of said block members, each of said magnets having a metallic plate fixed thereto on the side of said magnet away from said shaft;
  a pair of elongated rods having a first end extending through each of said plates, through its respective magnet without touching the same and connected to said block member and a second end adapted to extend through a hole of a diameter greater than the diameter of said rods in an electro-magnet mounted to one of said rails, said second end being adapted to be spaced in said hole from said electro-magnet;
  a sleeve mounted at each end of said shaft, each of said sleeves having a camming portion thereon, one of said sleeves having its camming portion mounted thereon on a side thereof opposite the side on which the camming portion of the other of said sleeves is mounted;
  a pair of contact switches associated with said housing, each of said switches having a sleeve contact portion thereon adapted to contact respective ones of said camming portion when said sleeves rotate with said shaft, said contact switches being electrically coupled to at least one DC storage battery, said battery being electrically coupled to each of said electro-magnetics, said magnets also being electrically coupled to said battery, said switches being normally inactivated when in contact with their respective sleeves and activated when in contact with their respective camming portions; and current supply control means associated with said switches and said battery for supplying current to said magnets and said electro-magnets when said plates are a predetermined distance from their respective electro-magnets whereby, when said sleeve contact portions engage said camming portions, an electrical signal is sent to said battery and then to said electro-magnets thereby pulling one of said plates and its respective magnet toward its respective electro-magnet while moving the other of said plates and its respective magnet away from its respective electro-magnet whereby said shaft is rotated.

2. In the apparatus of claim 1 wherein said shaft is rotatably mounted at each end in a bearing assembly mounted on said housing.

3. In the apparatus of claim 1 wherein each of said offset portions includes a first elongated portion fixed to said shaft and extending perpendicular to the axle thereof, a second elongated portion extending parallel to said first elongated portion and spaced therefrom and also fixed to said shaft, and a third elongated portion fixed to the free ends of each of said first and second elongated portions having a longitudinal axis extending parallel to the longitudinal axis of said shaft, said arms being connected to respective ones of said third elongated portions.

4. In the apparatus of claim 2 wherein a plurality of spaced holes are provided in each of said first and second elongated portions, said third elongated portion being adapted to be mounted in differing aligned holes on said first and second elongated portions.

5. In the apparatus of claim 1 wherein said plates are round.

6. In the apparatus of claim 1 wherein said rods extend through holes in the center of said magnets and are adapted to extend into holes in the center of said electro-magnets.

7. In the apparatus of claim 1 wherein the distance between each of said electro-magnet and its respective plate is adjustable.

8. In the apparatus of claim 1 wherein a flywheel is mounted on said shaft for providing inertia thereto to continue to rotate the same when electric current is not being supplied to said magnets and said electro-magnets.

9. In the apparatus of claim 8 wherein said flywheel is a weighted round member fixed to said shaft at its center.

10. In the apparatus of claim 1 including at least a second DC storage battery connected in series to said first mentioned battery.

11. In the apparatus of claim 1 wherein said sleeve contact portions are rotatably mounted on said contact switches.

12. In the apparatus of claim 1 wherein the apparatus is hermetically sealed inside of a housing, said shaft extending out of an opening in said last mentioned housing through a hermetic seal associated with said opening.

13. In the apparatus of claim 12 wherein said electromagnets are submersed in a cooling liquid or gas.

14. In the apparatus of claim 1 including microprocessing means associated with said current supply control means which, at times of power, needs for said apparatus distributes energy thereto and, at non-critical power demand cycles, shuts off power to said apparatus and activates battery recharging means associated with said battery.

15. In the apparatus of claim 14 wherein said recharging means is coupled to both said battery and said shaft.

16. Apparatus for converting electro-magnetism to rotational movement of a shaft or the like comprising:
a housing;
a rotatably mounted shaft mounted on said housing;
an elongated arm operatively connected at one end to said shaft and pivotally connected at the other end to a block member, each of said block members being slidably mounted on a pair of spaced elongated rails mounted on said housing;
a magnet fixedly mounted to each of said block members, each of said magnets having a metallic plate fixed thereto on the side of said magnet away from said shaft;
a pair of elongated rods having a first end extending through each of said plates, through its respective magnet without touching the same and connected to said block member and a second end adapted to extend through a hole of a diameter greater than the diameter of said rods in an electro-magnet mounted to one of said rails, said second end being adapted to be spaced in said hole from said electro-magnet;
a sleeve mounted at each end of said shaft, each of said sleeves having a camming portion thereon, one of said sleeves having its camming portion mounted thereon on a side thereof opposite the side on which the camming portion of the other of said sleeves is mounted;
a pair of contact switches associated with said housing, each of said switches having a sleeve contact portion thereon adapted to contact respective ones of said camming portion when said sleeves rotate with said shaft, said contact switches being electrically coupled to at least one DC storage battery, said battery being electrically coupled to each of said electro-magnetics, said magnets also being electrically coupled to said battery, said switches being normally inactivated when in contact with their respective sleeves and activated when in contact with their respective camming portions; and current supply control means associated with said switches and said battery for supplying current to said magnets and said electro-magnets when said plates are a predetermined distance from their respective electro-magnets whereby, when said sleeve contact portions engage said camming portions, an electrical signal is sent to said battery and then to said electro-magnets thereby pulling one of said plates and its respective magnet toward its respective electro-magnet while moving the other of said plates and its respective magnet away from its respective electro-magnet whereby said shaft is rotated.

* * * * *